US007424618B2

(12) United States Patent
Roy et al.

(10) Patent No.: US 7,424,618 B2
(45) Date of Patent: Sep. 9, 2008

(54) BIOMETRIC ACCESS CONTROL AND TIME AND ATTENDANCE NETWORK INCLUDING CONFIGURABLE SYSTEM-ON-CHIP (CSOC) PROCESSORS WITH EMBEDDED PROGRAMMABLE LOGIC

(75) Inventors: Ronald B. Roy, Sunrise, FL (US); John C. Sadlon, Sunrise, FL (US)

(73) Assignee: Paladin Electronic Services, Inc., Sunrise, FL (US)

( * ) Notice: Subject to any disclaimer, the term of this patent is extended or adjusted under 35 U.S.C. 154(b) by 825 days.

(21) Appl. No.: 10/097,704

(22) Filed: Mar. 14, 2002

(65) Prior Publication Data

US 2002/0133725 A1    Sep. 19, 2002

Related U.S. Application Data

(60) Provisional application No. 60/275,865, filed on Mar. 14, 2001.

(51) Int. Cl.
*H04K 1/00*      (2006.01)
*H04L 9/00*      (2006.01)
*G06K 9/00*      (2006.01)
*G05B 19/00*     (2006.01)
*G05B 23/00*     (2006.01)
*G06F 7/00*      (2006.01)
*G06F 7/04*      (2006.01)
*G08C 19/00*     (2006.01)
*H04B 1/00*      (2006.01)
*H04B 3/00*      (2006.01)
*H04Q 1/00*      (2006.01)
*H04Q 9/00*      (2006.01)
*G06Q 10/00*     (2006.01)

(52) U.S. Cl. .................. 713/186; 382/115; 382/124; 382/125; 382/126; 340/5.8; 340/5.82; 705/5

(58) Field of Classification Search .................. 713/186; 382/124, 118, 115, 126, 125; 340/5.8, 5.82; 705/5
See application file for complete search history.

(56) References Cited

U.S. PATENT DOCUMENTS

| | | | |
|---|---|---|---|
| 5,748,765 A | 5/1998 | Takhar | |
| 6,002,787 A | 12/1999 | Takhar et al. | |
| 6,119,096 A * | 9/2000 | Mann et al. | 705/5 |
| 6,243,492 B1 * | 6/2001 | Kamei | 382/181 |
| 6,314,196 B1 * | 11/2001 | Yamaguchi et al. | 382/125 |
| 6,330,345 B1 * | 12/2001 | Russo et al. | 382/115 |
| 6,360,004 B1 * | 3/2002 | Akizuki | 382/124 |
| 6,496,595 B1 * | 12/2002 | Puchek et al. | 382/124 |
| 6,657,538 B1 * | 12/2003 | Ritter | 340/5.81 |
| 6,757,410 B1 * | 6/2004 | Nakashima | 382/124 |
| 7,151,846 B1 * | 12/2006 | Fujii | 382/125 |
| 2002/0048390 A1 * | 4/2002 | Ikegami | 382/124 |

OTHER PUBLICATIONS

Knapp et al., "Field Configurable System-on-Chip Device Architecture", May 21-24, 2000, IEEE 2000 Custom Inntegrated Circuits Conference, pp. 155-158.*

* cited by examiner

*Primary Examiner*—Ayaz Sheikh
*Assistant Examiner*—Shin-Hon Chen
(74) *Attorney, Agent, or Firm*—Malin Haley; DiMaggio Bowen & Lhota, P.A.

(57) ABSTRACT

A biometric access control and time and attendance system comprises an integrated network including one or more remote access devices in electronic communication with a computer database. Each remote access device comprises a silicon chip based system and preferably includes a biometric input device, a liquid crystal display (LCD), computer processing capabilities based on embedded system architecture with configurable system-on-chip (CSOC) technology, and an electrical output for controlling a door lock or the like. The use of CSOC architecture in lieu of conventional personal computer technology (e.g. mother boards, hard drives, video controllers and the like) allows for a more compact and cost efficient design. A plurality of remote access devices is configured for communication with a primary computer database wherein data corresponding to biometric samples for all authorized users is stored. In an embodiment wherein the biometric input devices comprise fingerprint scanners, the devices are configured to facilitate fingerprint identification by incorporating an auto-targeting capability that enables the user to simply place his or her finger on the fingerprint scanner whereafter the system adjusts the scanned image by automatically shifting the scanned image data to a properly targeted position thereby enabling the system compare the scanned print to the biometric samples in the system's data storage memory. Auto-targeting capability eliminates the requirement for manual targeting present in systems of the background art thereby improving system performance and minimizing reliance on human interaction. The present invention contemplates the use of auto-targeting with other biometric systems, such as facial recognition and/or retinal scanning systems, or any other biometric identification technology.

2 Claims, 12 Drawing Sheets

Figure 6B
Rear View

Figure 6A
Front View

Embedded System Prototype
Draft Drawing with LCD and Keypad

Figure 7

Figure 8B
Rear View

Figure 8A
Front View

Embedded System Prototype
Draft Drawing with Keypad
(Unit Incorporates Auto Targeting)

Figure 11

BIOMETRIC ACCESS CONTROL AND TIME AND ATTENDANCE NETWORK INCLUDING CONFIGURABLE SYSTEM-ON-CHIP (CSOC) PROCESSORS WITH EMBEDDED PROGRAMMABLE LOGIC

CROSS REFERENCE TO RELATED APPLICATIONS

This application claims the benefit of provisional U.S patent application Ser. No. 60/275,865 filed Mar. 14, 2001.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to biometric access control and time and attendance systems, and, more particularly to a biometric access control and time and attendance system incorporating a plurality of biometric input units incorporating configurable system on chip processors with embedded programmable logic architecture adapted for network communications.

2. Description of the Background Art

Individuals have measurable, physical characteristics that are essentially unique and may thus be used to distinguish one individual from another. Biometrics is the science of using such measurable characteristics to recognize and/or verify the claimed identity of a person. Biometric devices automate personal recognition and identification by comparing unique physical characteristics such as fingerprints.

Systems based on biometric identification are in use in various access control and time and attendance applications. Biometric systems typically comprise an automated system having one or more biometric input devices capable of capturing a biometric sample from a user, extracting biometric data from the sample, comparing the biometric data with that contained in one or more reference templates; determining whether a match exists; indicating whether verification of identity has been achieved, and triggering an event based on the verification. Biometric access control systems are used to selectively restrict and/or permit access to various areas within a facility by requiring a biometric match and confirmation of access authorization prior to facilitating access, for example by unlocking a door. Biometric time and attendance systems are used to capture and confirm attendance related data based on biometric identification.

Biometric access controls vary in performance, complexity, and cost. Some systems rely on voice recognition, facial recognition, fingerprints, palm geometry, while others rely on retinal scanning. The widest use of biometric identification, however, employs the use of fingerprint identification. Biometric fingerprint identification systems typically include remote fingerprint scanners located proximate an access door and are adapted to limit access to certain individuals within certain date and time parameters. Access to the space is facilitated only when the individual's fingerprint is scanned by a fingerprint scanning device and access permission is verified. Upon authentication, access is typically granted by the sending of an electronic signal to the door lock thereby allowing the user to pass through the door. In addition, the actual opening of the door may be confirmed by the system where the door is equipped with magnetic proximity sensors.

Biometric time and attendance systems function to record time and attendance parameters in the workplace. Biometric time and attendance systems are capable of very accurate employee time and attendance tracking, a critical aspect of any employee-based organization. One of the biggest problems in controlling payroll costs involves tracking time and attendance for hundreds and/or thousands of employees. Accurate payroll requires an accurate time-clock system and accurate time-clock punches. Without accurate time and attendance tracking, inaccurate paychecks are distributed thereby resulting in a waste of corporate resources.

Biometric identification systems currently used in the art, however, are burdened with a number of significant disadvantages that have limited use of the systems in both access and time and attendance applications. One significant disadvantage present with such systems is the cost of biometric devices. As a result of the data processing requirements associated with biometric input and identification, biometric systems of the prior art have required substantial on-board computer processing capabilities. As a result, remote biometric input devices typically require fully functional, on-board computer hardware and software thereby increasing costs and making widespread use on a large number of access doors cost prohibitive. For example, biometric identification units of the background art rely on conventional personal computer hardware and software (e.g. processor, hard drive, motherboard, video controllers, operating systems, etc.) installed on-board to enable the system to process and store data and to otherwise facilitate operation. Accordingly, biometric identification units of the background are burdened with an overabundance of computer hardware and software. The requirement for such an abundance of computer hardware and software at each remote access location, however, is cost prohibitive thereby limiting universal use of this technology.

Another significant disadvantage present with biometric identification units that rely on data obtained from fingerprint scanners is that the performance of such systems is somewhat limited as the systems of the background art are designed to verify the identity of an individual by comparing the biometric data obtained by a remote fingerprint scanner with a previously obtained biometric data sample provided by the user (e.g. one to one comparison). The biometric sample is typically obtained when the user initially registers with the system administrator and is subsequently stored in a computer database. This method requires that each user be assigned a Personal Identification Number (PIN), or other personal code apparatus (e.g. magnetic card or the like), which code is entered into the system at the time of requested access or time event (e.g. punch-in or punch-out) whereby the stored biometric data sample associated with the code is retrieved from computer memory and compared to the biometric data obtained at the fingerprint scanner, e.g. one-to-one method. If the one to one comparison produces a match, access may be granted and/or time and attendance is recorded. Such reliance on human interaction however is undesirable, as users are known to forget PIN numbers, make input errors, and or lose or damage access cards thereby preventing reliable use of the system.

Still another disadvantage present with fingerprint identification systems of the background art relates to centering of the user's finger on the fingerprint scanner such that a valid comparison may be made by the system. Fingerprint scanning systems of the background art typically require that the user "center" his or her finger on the scanner such that a valid scan of a sufficient and specific portion of the fingerprint may be obtained. Accordingly, the user is often required to reposition his or her finger until centered within a target area indicated on a visual display associated with the scanning device. Only when the user's finger is properly centered will systems of the background art obtain a fingerprint scan that may be compared with the biometric sample of record. It has been found, however, that requiring the user to manually center his or her finger can be time consuming, confusing and difficult for the user.

Accordingly, there exists a need for an improved biometric access control and time and attendance system that overcomes the disadvantages present in systems known in the background art.

BRIEF SUMMARY OF THE INVENTION

The present invention provides a biometric access control and time and attendance system that substantially overcomes the disadvantages present in the background art. A biometric access control system according to the present invention comprises an integrated network including one or more remote access devices in electronic communication with a computer database. Each remote access device comprises a silicon chip based system and preferably includes a biometric input device, a liquid crystal display (LCD), computer processing capabilities based on embedded system architecture with configurable system-on-chip (CSOC) technology, and an electrical output for controlling a door lock or the like. The use of CSOC architecture in lieu of conventional personal computer technology (e.g. mother boards, hard drives, video controllers and the like) allows for a more compact and cost efficient design. A plurality of remote access devices is configured for communication with a primary computer database wherein data corresponding to biometric samples for all authorized users is stored.

In an embodiment wherein the biometric input devices comprise fingerprint scanners, the devices are configured to facilitate fingerprint identification by incorporating an auto-targeting capability. In a perfect world, the user would place his/her finger on the fingerprint scanner such that the center of the fingerprint would be perfectly aligned with the center of the scanning area. Human interaction, however, with a mechanical scanning device is not perfect and misalignment of the fingerprint in the scanning area is a very common occurrence. With an auto-targeting feature, the user simply places his or her finger on the fingerprint scanner and the system adjusts the scanned image by automatically shifting the scanned image data to a properly targeted position thereby enabling the system compare the scanned print to the biometric samples in the system's data storage memory. Auto-targeting with respect to fingerprints, is the process of digitally moving an image so that the center of the fingerprint image is aligned with the center of the scanner without regard to the actual placement of the finger on the scanner. The auto-targeting capability thus eliminates the requirement for manual targeting present in systems of the background art thereby improving system performance and minimizing reliance on human interaction. By automatically digitally moving the fingerprint image to align the center of the fingerprint to the center of if scanning area results in a higher success rate for the one to many comparisons required for authentication of a match. The present invention contemplates the use of auto-targeting with other biometric systems, such as facial recognition and/or retinal scanning systems, or any other biometric identification technology.

Accordingly, it is an object of the present invention to provide an improved biometric access and time and attendance system.

Still another object of the present invention is to provide an improved biometric access control and/or time and attendance system incorporating embedded system architecture.

Yet another object of the present invention is to provide a biometric access system incorporating configurable system on chip hardware and embedded system architecture that is adapted for network communications.

Still another object of the present invention is to provide a remote biometric input device that is capable of auto-targeting the user's biometric data for optimizing identification.

DETAILED DESCRIPTION OF THE INVENTION

Figure 1:
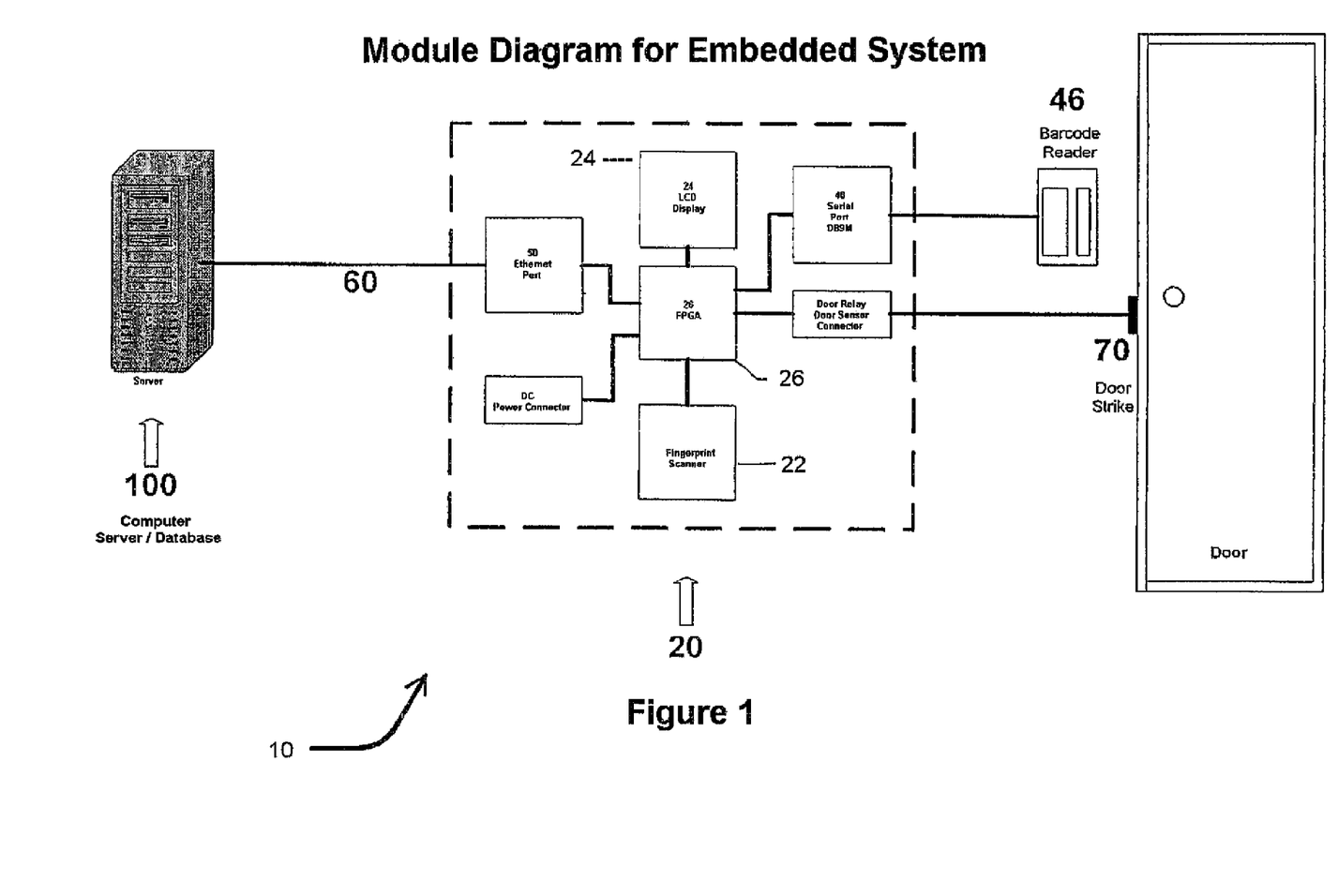
FIG. 1 is a block diagram of a biometric access control and time and attendance system according to the present invention.

With reference now to the drawings, FIGS. 1 through 4 depict various hardware block diagrams for biometric access control and time and attendance systems according to the present invention. FIG. 1 depicts a hardware component block diagram of a biometric access control embodiment of the present invention, generally referenced as 10, adapted to control access to a space by selective actuation of a locking door. In the preferred embodiment, the system comprises an integrated network including a plurality of remote access devices, generally referenced as 20, in communication with a computer database maintained at remote computer server, referenced as 100. Computer server 100 may be any conventional personal computer configured as a data server and functions to receive, store, and provide access to biometric samples data (e.g. fingerprint, retina, and/or facial biometric samples, or other biometric sample data) obtained from individual users upon registering with the system administrator. In the access control embodiment, each remote access device is electrically connected to a security device, such as a relay actuated door lock or door strike, generally referenced as 70, and functions to grant access to the space upon authentication of a user's biometric fingerprint and confirmation that the user is authorized to gain access to the specific space at a specific time and day. In the time and attendance embodiment, each remote access device further provides a time clock is function thereby enabling users to "punch-in" by having their identification verified by biometric comparison. It should be noted that both access control and time and attendance functions may operate concurrently such that a single biometric identification verification provides both access to the workplace and records time and attendance.

Each remote access device preferably includes a biometric input device 22, such as a fingerprint scanner, a display 24, and a data processing system 26 comprising configurable system-on-chip (CSOC) that includes a processor, embedded programmable logic, a high-speed bus and memory. Although FIG. 1 depicts the biometric input device 22, LCD display 24, and a data processor 26 contained within a single housing, referenced as 20, the components need not necessarily be configured as such, and components, such as the biometric input device 22 may be remotely located and/or configured.

Figure 2:
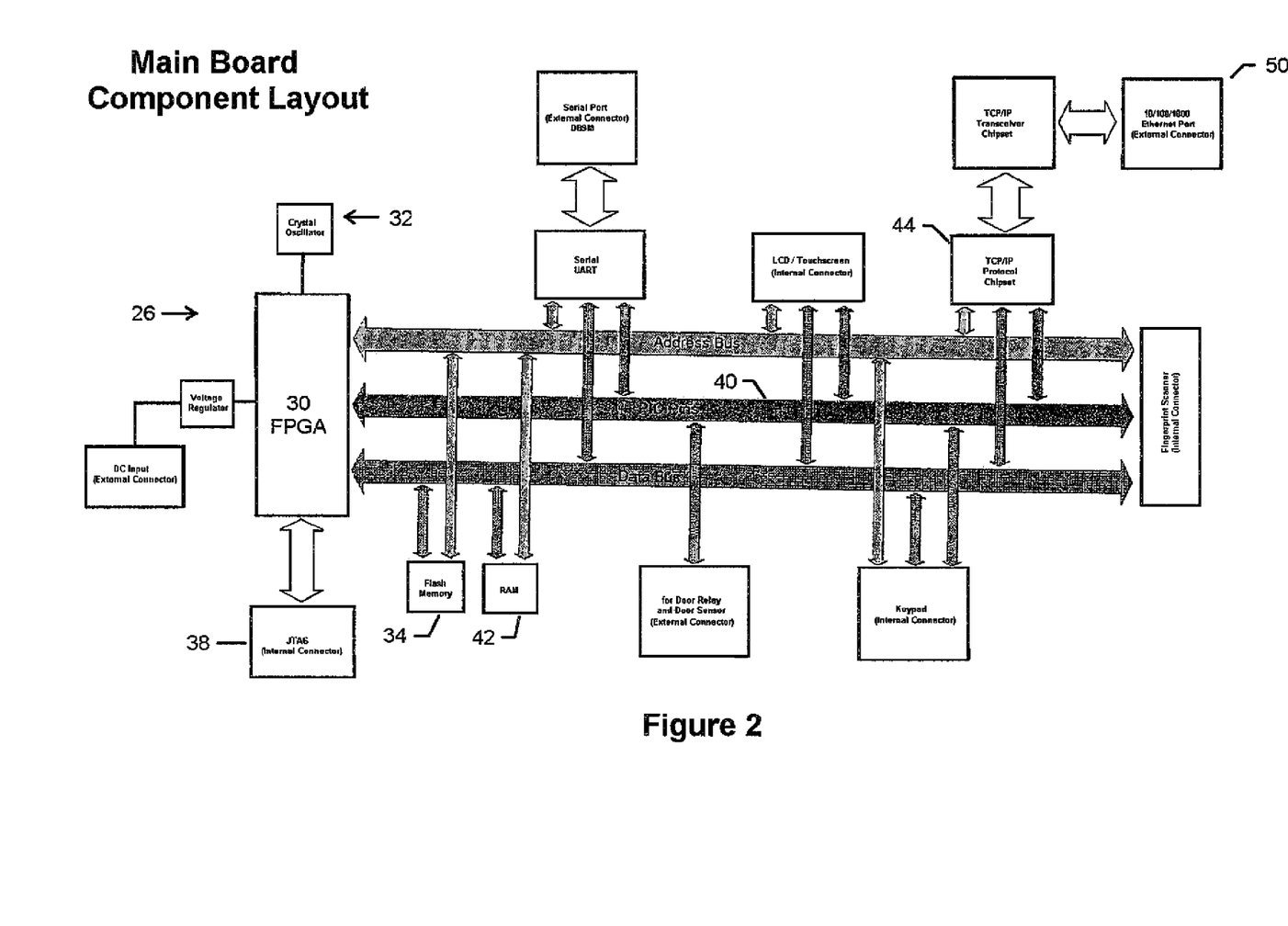
FIG. 2 is a block diagram for the embedded system architecture incorporated with a remote access fingerprint scanning device according to the present invention.

As best depicted in FIG. 2, data processor 26 is preferably a configurable embedded system that includes a configurable system-on-chip (CSOC) 30 in lieu of conventional personal computer hardware. Configurable system-on-chip 30 includes a microprocessor with embedded programmable logic, and is adapted for use with a high-speed bus, and memory. A suitable CSOC is available Triscend Corporation as Triscend model TE520. As best seen in FIG. 2, CSOC 30 is connected to a crystal oscillator 32, flash memory 34, a power regulator 36, a JTAG port 38, and a parallel interface option (PIO) bus 40. PIO bus 40 provides a means for interfacing of additional hardware and communications components to the CSOC, such as additional RAM memory 42, a TCP/IP communications interface 44, a barcode scanner 46, fingerprint scanner 22, RS-232 input/output port 48, LCD 24, and a connection to an Ethernet 10 BaseT module 50 for network communications. Crystal oscillator 32, is preferably a 30 MHz device which functions to provide a clock counter for all timing and/or time sensitive functions associated with the system. Flash memory 34 provides data storage for the programmable logic used by the system to operate. Power regulator 36 functions to supply CSOC 30 with low voltage power from a conventional 120 VAC power adapter or a DC power source. JTAG port 38 provides an electrical connection to facilitate configuration of CSOC 30 with configuration software residing on a computer workstation (not shown). In applications where the biometric input device 22 comprises a fingerprint scanner, such device is preferably a high-resolution (i.e. 1000 DPI) scanning device capable of obtaining a detailed fingerprint image. A suitable fingerprint scanner is available from Secugen Model OPP-01, which requires a 5-Volt DC input and provides 352×292 pixel depth. As noted herein, however, any suitable biometric input device is considered within the scope of the present invention. Accordingly, biometric input device 22 may comprise retinal scanning technology, facial recognition technology, palm-scanning technology, or any other suitable biometric identification technology. RAM memory 42 provides a data storage means for storing biometric sample data (e.g. scanned fingerprint data) obtained for all users. The RAM memory 42 may be periodically updated through network communications such that biometric samples for each user are maintained at each remote access device. The TCP/IP component provides a primary communications port for CAT5 cabling.

Figure 3:
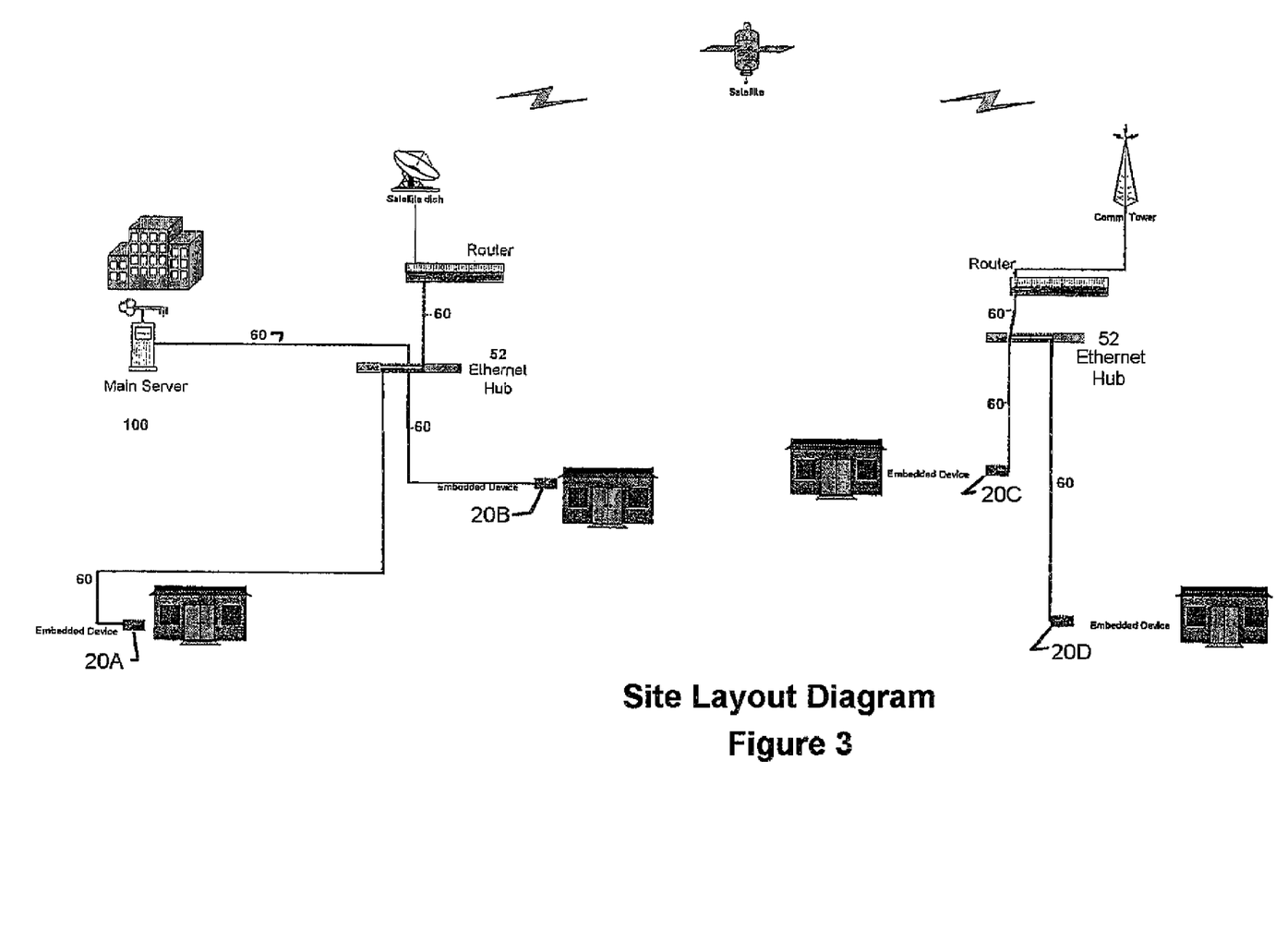
FIG. 3 is a system diagram of a remote access and time and attendance system according to the present invention.
Figure 4:
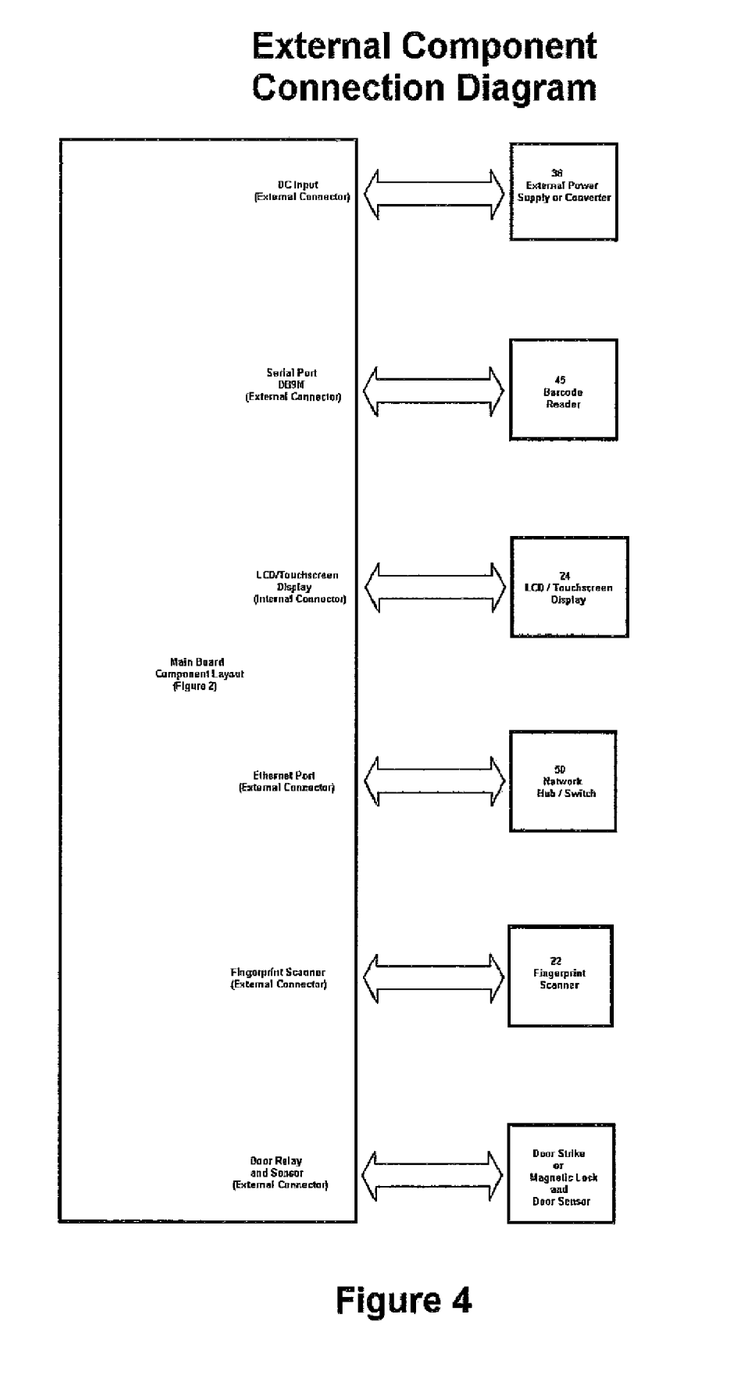
FIG. 4 is an external component connection diagram depicting external components connected to the main board shown in FIG. 2.

As best seen in FIG. 3, the present system is adapted for network communications to facilitate remote operation in both access control, as well as time and attendance applications. A plurality of biometric access devices, referenced as 20A through 20D, each communicate with an Ethernet hub 52 via one or more Ethernet modules using CAT 5 communication connections 60. Remote communication with a main server 100 is facilitated by conventional land based and satellite telecommunication devices. Main server 100 provides data storage capabilities for receiving and storing data relating to biometric samples provided by the users upon registration with the system administrator. Biometric data stored on main server 100 may be periodically uploaded through the system and downloaded to each remote access device 20 where the data is received and stored on and accessed from RAM 42.

The system generally functions according to the following steps: (1) capturing a biometric sample from a user (e.g. fingerprint scan, retinal scan etc.); (2) extracting biometric data from the sample; (3) comparing the biometric data with that contained in one or more reference templates in a one to many comparison; (4) determining whether a match exists by application of a fingerprint identification algorithm; (5) indicating whether verification of identity has been achieved; and (6) triggering an event based on the verification of a biometric sample. Extraction of the biometric sample may be obtained, along with other user related information such as authorized work schedule and restrictions regarding access to certain areas, when the user registers with the system by fingerprint scan. Once obtained, the biometric sample is stored in memory at the main server and uploaded to each remote access device wherein the data is stored in RAM memory 42. Accordingly, to gain access to a space and/or to "punch in" and record time and attendance in applications configured for fingerprint identification, the user simply places his or her finger onto the fingerprint scanner 22 existing on one of the remote access devices 20 and the fingerprint is automatically scanned. In an embodiment of the invention adapted with the auto-targeting feature the scanned fingerprint image is automatically aligned so as to be optimized for authentication by comparison of the scanned print with all of the biometric samples stored in memory (e.g. one-to-many comparison). In an embodiment not adapted for auto-targeting, the user is required to manually center his or her finger such that a suitable image is obtained by the fingerprint scanner. In that case, an audible or visual feedback feature will function to assist the user in the proper positioning of his or her finger. Fingerprint authentication is preferably obtained by a method of analyzing fingerprints, such as the method disclosed in U.S. Pat. No. 6,002,787, issued to Takhar et al., titled Fingerprint Analyzing and Encoding System, the disclosure of which is hereby incorporated herein by reference. The method applies a fingerprint identification algorithm to a scanned fingerprint image and is capable of generating a positive match between the fingerprint image scanned at the remote device and one of many previously scanned images existing in a database.

Figure 5:
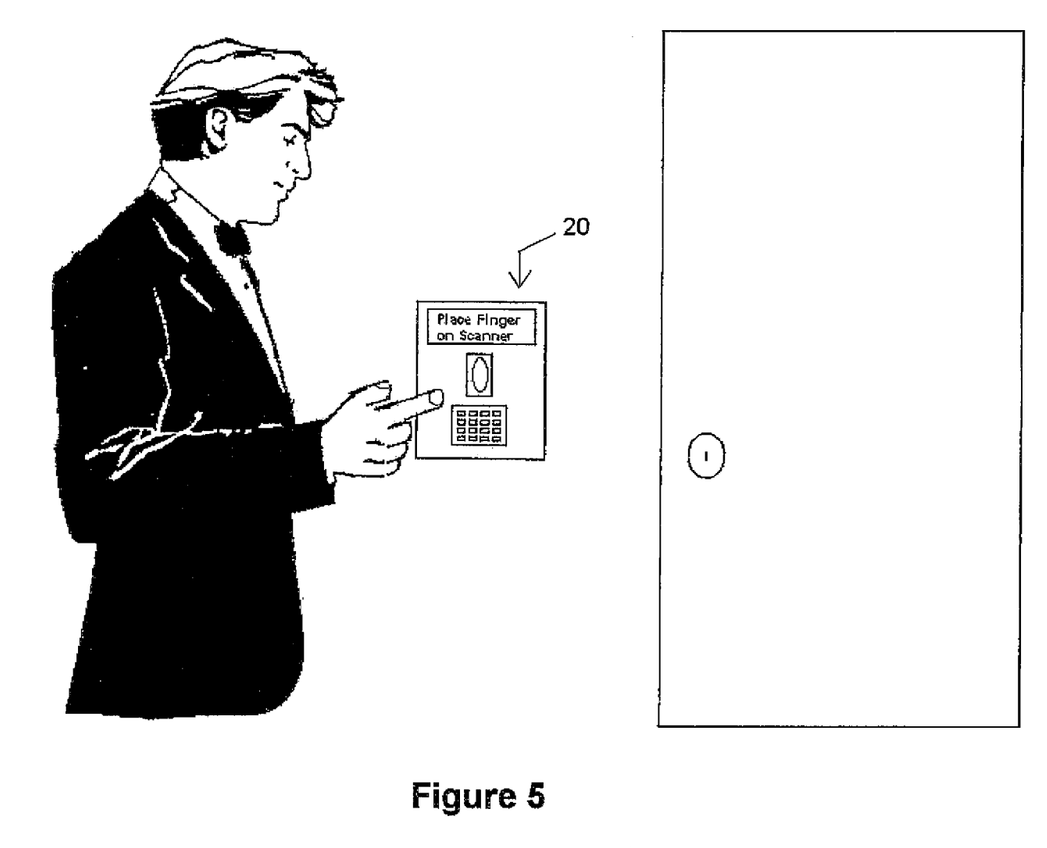
FIG. 5 illustrates an embodiment of a biometric access device according to the present invention installed in proximity to a door for controlling access to an area.
Figure 6A:
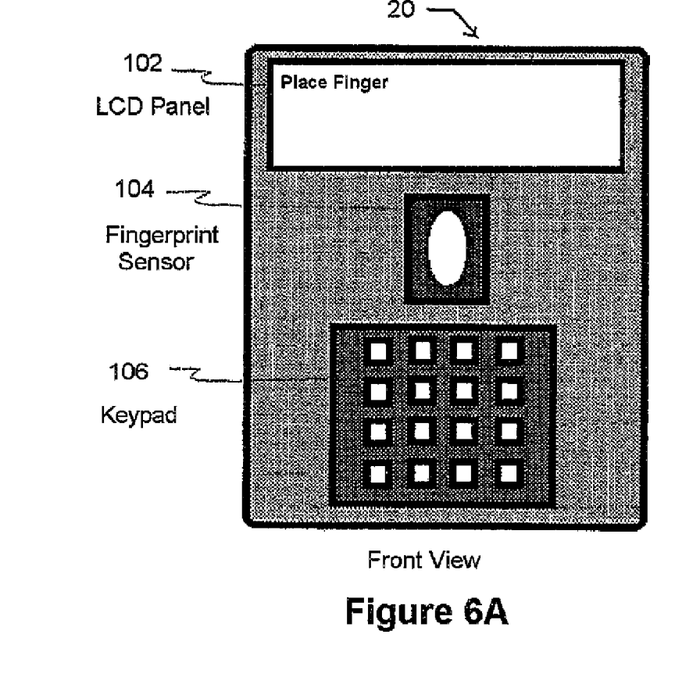
FIGS. 6A and 6B depict front and rear views of the embedded system shown in FIG. 5.
Figure 6B:
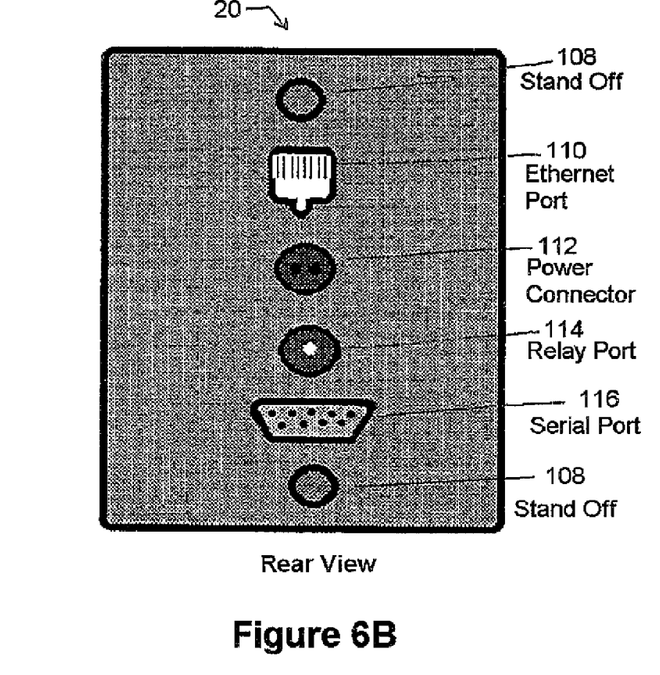
Figure 7:
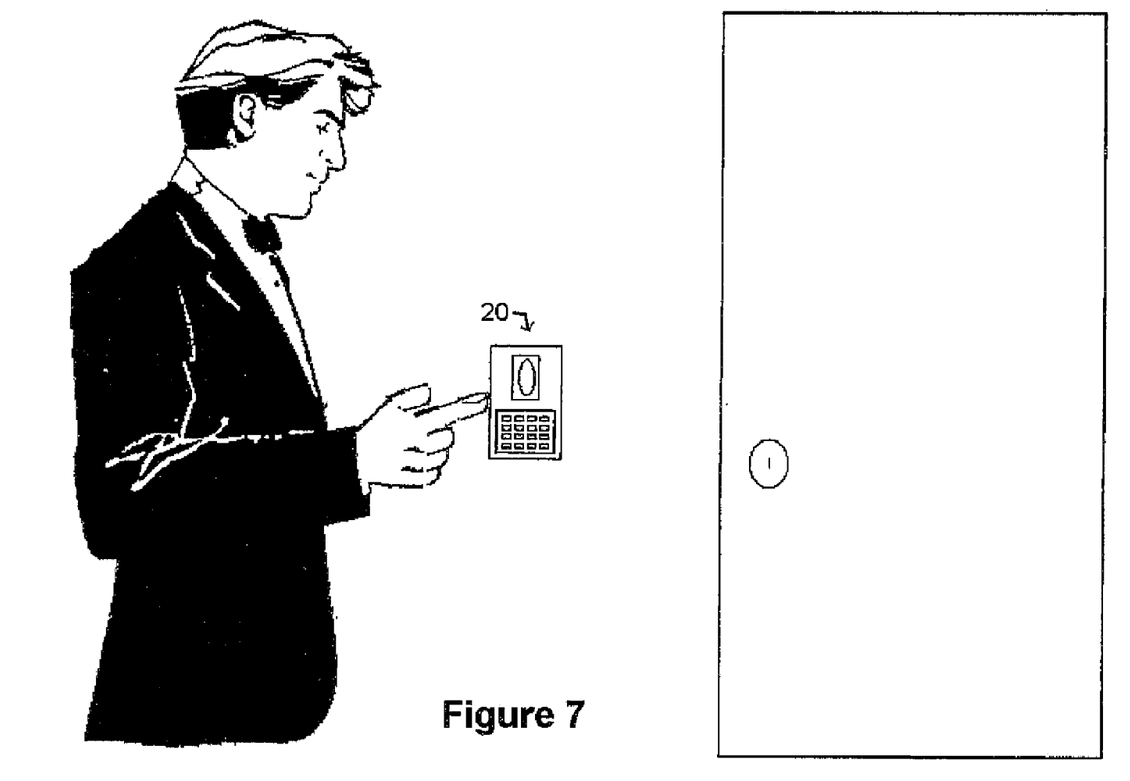
FIG. 7 illustrates an alternate embodiment of a biometric access device installed in proximity to a door for controlling access to an area.
Figure 8A:
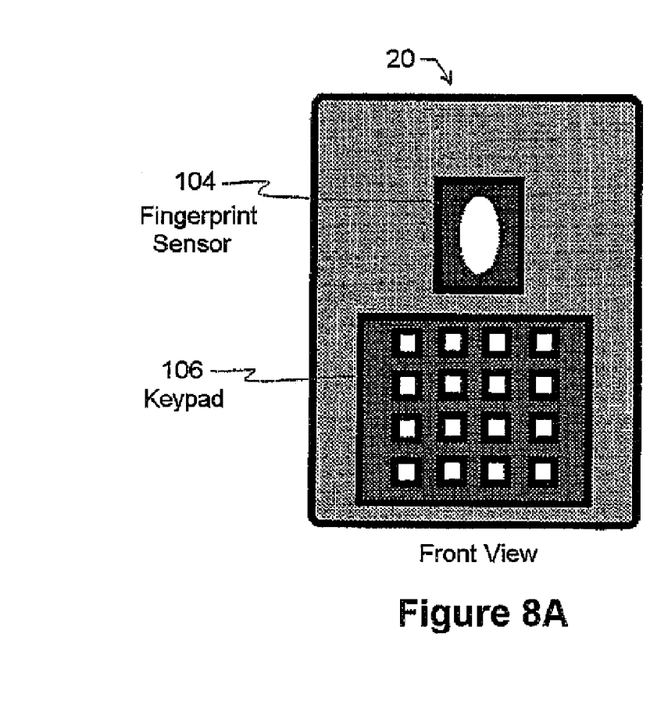
FIGS. 8A and 8B depict front and rear views of the embedded system shown in FIG. 7.
Figure 8B:
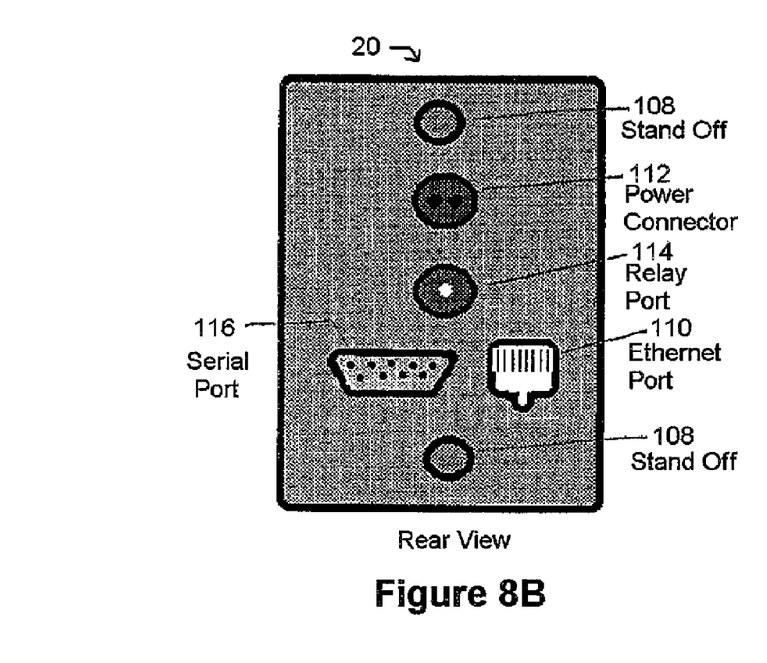
Figure 9:
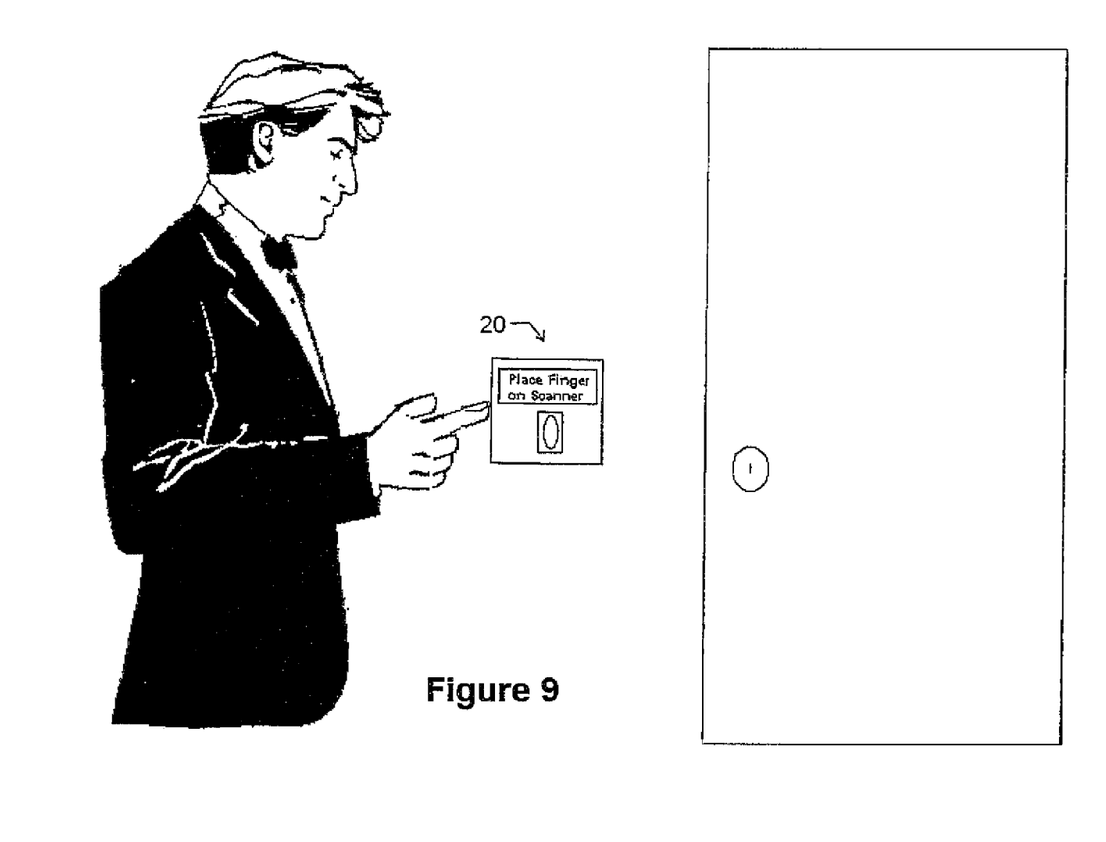
FIG. 9 illustrates an alternate embodiment of a biometric access device installed in proximity to a door for controlling access to an area.
Figure 10A:
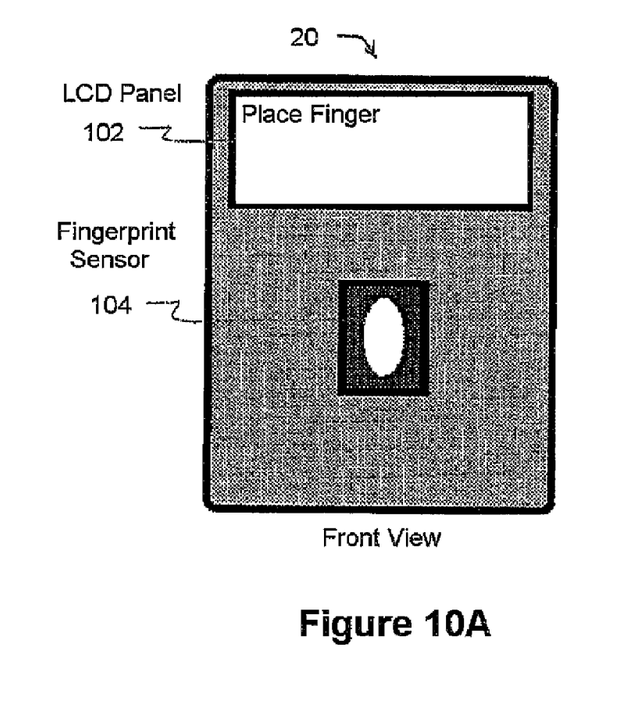
FIGS. 10A and 10B depict front and rear views of the embedded system shown in FIG. 9.
Figure 10B:
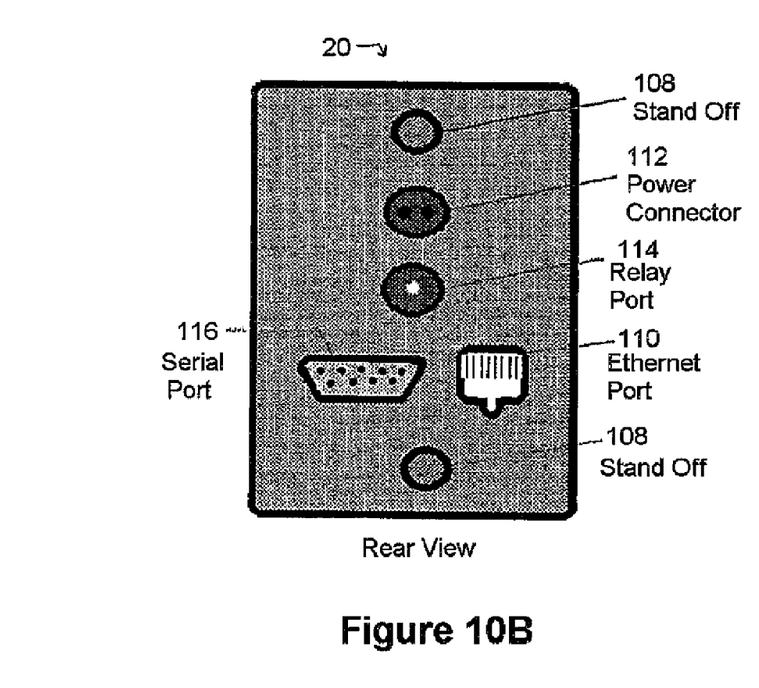
Figure 11:
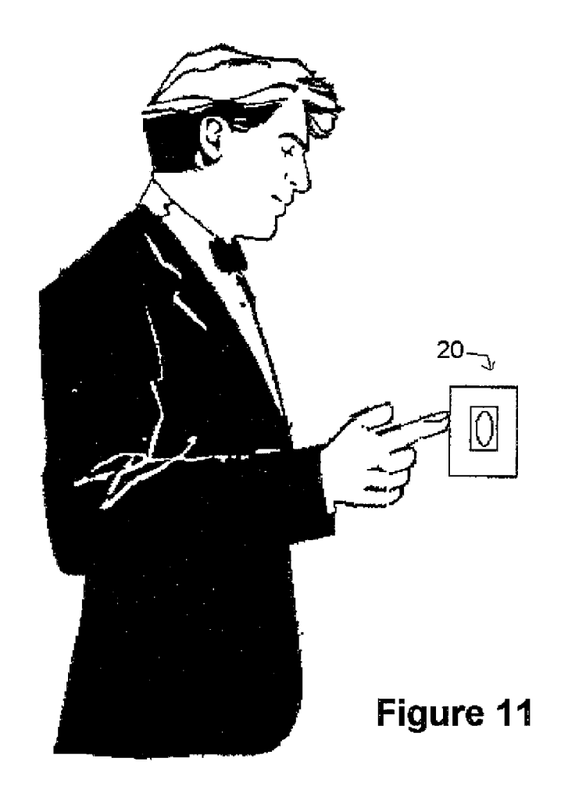
FIG. 11 illustrates an alternate embodiment of a biometric access device installed in proximity to a door for controlling access to an area.
Figure 12A:
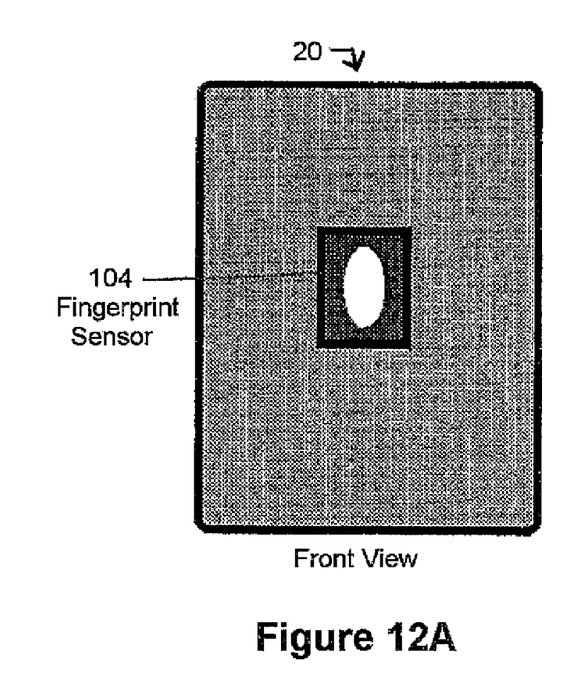
FIGS. 12A and 12B depict front and rear views of the embedded system shown in FIG. 11.
Figure 12B:
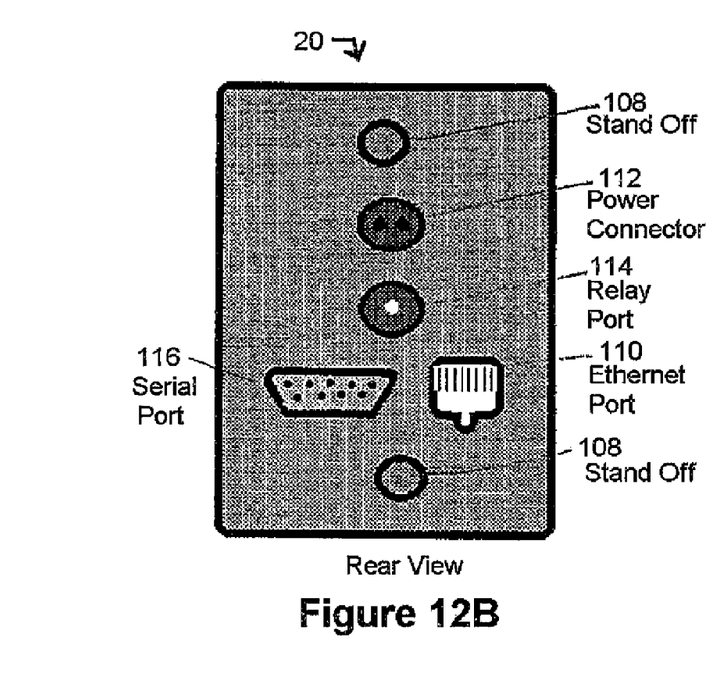

FIG. 5 illustrates a preferred embodiment of a biometric time and attendance and/or access device, referenced as 10, mounted adjacent to a door to a restricted space. FIGS. 6A and 6B depict front and rear views of the biometric device 10. As seen in FIG. 6A, biometric device 10 may include a liquid crystal display ("LCD") 102, a fingerprint scanner/sensor 104, and a keypad 106. Liquid crystal display 102 functions as an output display for providing text and/or graphical output to facilitate operation. For example display 102 may be used in applications where auto-targeting is not activated and the user is required to manually center his/her finger on scanner 104. In such situations display 102 may provide graphical feedback to assist the user in centering his/her finger. Fingerprint scanner 104 functions to obtain digital biometric sample data by interface with the user. Keypad 106 functions as an input device to further facilitate system operation. Keypad 106 may be used to input personal identification numbers and/or for override functions. As seen in FIG. 6B the rear portion of device 10 includes mounting structures 108, an Ethernet port 110, a power connector 112, a relay port 114, and a serial port 116. Mounting structures 108 function to allow the device to be mounted, such as on a wall. Ethernet port 110 functions as an input for network applications, such as wherein a remote computer server is used to store biometric models for a plurality of users. Power connector 112 functions as a power supply input for applications wherein power is provided from a remote source. Relay port 114 functions as voltage output relay for access control applications wherein access is controlled to a restricted space. For example, a 12 Volt output signal can be generated by the device to selectively open a door lock. Serial port 116 functions as an input port for an optional auxiliary device, such as a card reader and/or barcode reader. FIGS. 7, 8A and 8B depict an alternate embodiment of device 10 that is not adapted with an LCD. FIGS. 9, 10A and 10B depict an embodiment of device 10 that is not adapted with a keypad. Finally, FIGS. 11, 12A and 12B depict an embodiment of device 10 that is adapted only to include the fingerprint scanner 104. The embodiment depicted in FIGS. 11, 12A and 12B is preferably adapted with the auto-targeting feature disclosed herein to facilitate obtaining a biometric sample.

As should be apparent, the present invention may be configured such that digital biometric sample data is stored on a remote computer server 100 which may be accessed by a plurality of biometric devices 10. In an alternate embodiment, however, each biometric device 10 may be adapted with sufficient on-board memory to enable the device to store all the necessary biometric sample data on-board such that communication with the server is not required to verify the user's identity and authorize access to a restricted space.

METHOD OF OPERATION—ACCESS CONTROL MODE

When a remote access device is configured for fingerprint identification access control the system thus operates according to the following steps: (1) individual places finger on the fingerprint scanner; (2) fingerprint is scanned and the image is received; (3) the image is stored in memory; (4) a fingerprint identification algorithm analyzes the scanned image and a fingerprint identification model is created; (5) the fingerprint identification model is stored in memory; (6) the fingerprint identification model is transmitted to the computer server via network cabling; (7) the fingerprint is verified in the server database as authorized or unauthorized; (8) if the user is authenticated and authorized, the server records the user I.D., date, time and remote access station I.D., and the server transmits an acceptance code to the remote access station, whereafter a 12 Volt signal is sent from the remote access device to the entry point relay circuit and confirmed by visual display for five seconds; (9) if the user is authenticated but is not authorized, the server records the user I.D., date, time and remote access station I.D., and the server transmits a rejection code to the remote access station, which rejection is indicated on the visual display; (10) if the user is not registered with the system (e.g. no biometric sample on file), the server records date, time and remote access station I.D., and the server transmits a rejection code to the remote access station; (11) after either event 8, 9, or 10, the remote station returns to a default mode wherein the station is ready for the next fingerprint scan.

METHOD OF OPERATION—TIME AND ATTENDANCE MODE

When a remote access device is configured for fingerprint time and attendance duty the system operates according to the following steps: (1) individual places his or her finger on the fingerprint scanner; (2) fingerprint is scanned and the image is received; (3) the image is stored in memory; (4) a fingerprint identification algorithm analyzes the scanned image and a fingerprint identification model is created; (5) the fingerprint identification model is stored in memory; (6) the fingerprint identification model is transmitted to the computer server via network cabling; (7) the fingerprint is verified in the server database as valid or not valid; (8) if the user is authenticated and authorized to commence work, the server records the user I.D., date, time and remote access station I.D., and the server transmits an acceptance code to the remote access station, whereafter an acceptance message is displayed on the visual display for five seconds; (9) if the user is authenticated but is not authorized, the server records the user I.D., date, time and remote access station I.D., and the server transmits a rejection code to the remote access station, which rejection is indicated on the visual display; (10) if the user is not registered with the system (e.g. no biometric sample on file), the server records date, time and remote access station I.D., and the server transmits a rejection code to the remote access station; (11) after either event 8, 9, or 10, the remote station returns to a default mode wherein the station is ready for the next fingerprint scan.

Computer server 100 preferably maintains a complete log of system activity such that reports may be generated for system administration. Accordingly, the system may maintain records of user access, attempted access, times, dates etc. The present invention thus provides a cost effective access control and time and attendance system that provides full biometric capabilities without requiring an overabundance of computer hardware or software.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What we claim is:

1. A method of biometric identification using fingerprints comprising the steps of:

obtaining a digital biometric fingerprint registration sample from each of a plurality of users by manually positioning each user's fingerprint to a core centered position within a scanning window on a fingerprint scanner, scanning the user's fingerprint, and generating a registration sample data model for each fingerprint, said registration sample data model including data relating to areas disposed in 360 degree surrounding relation with the core;

storing said digital biometric fingerprint registration models on a computer database;

subsequently obtaining a digital look-up biometric sample from a user without requiring that the user's fingerprint be centered on the fingerprint scanner such that the user's fingerprint core may be positionally offset and disposed at any angular position on the fingerprint scanner;

automatically eliminating portions of said look-up biometric sample in 360 degree surrounding relation with the core of said look-up biometric sample that would not have been captured during the registration process with the user's fingerprint core centered on the fingerprint scanner;

generating a look-up sample data model from said look-up biometric sample, said look-up biometric sample not including data corresponding to eliminated portions;

comparing said look-up sample data model with all of said registration data models and verifying whether said look-up sample data model matches one of said registration data models.

2. A method of biometric identification according to claim 1, wherein said automatically eliminating portions of said look-up biometric sample in 360 degree surrounding relation with the core of said look-up biometric sample that would not have been captured during the registration process includes:

(a) identifying the core center of said look-up biometric sample; and (b) eliminating those portions of said look-up biometric sample that would have fallen outside said scanning window with the fingerprint in said core centered position.

* * * * *